(No Model.)

R. BUSSE.
SAFETY GAS COCK.

No. 595,142. Patented Dec. 7, 1897.

Witnesses
Harold H. Timms
Edwin Cruse

Inventor
Rudolph Busse.
By his Attorneys,
C. A. Snow & Co.

UNITED STATES PATENT OFFICE.

RUDOLPH BUSSE, OF BETHLEHEM, PENNSYLVANIA.

SAFETY GAS-COCK.

SPECIFICATION forming part of Letters Patent No. 595,142, dated December 7, 1897.

Application filed August 19, 1897. Serial No. 648,817. (No model.)

*To all whom it may concern:*

Be it known that I, RUDOLPH BUSSE, a citizen of the United States, residing at Bethlehem, in the county of Lehigh and State of Pennsylvania, have invented a new and useful Safety Gas-Cock, of which the following is a specification.

This invention relates to safety gas-cocks, its objects being to provide a cock which may be easily connected to the gas-pipe and to provide the same with spring-actuated locking devices to prevent the accidental turning of the valve and also to provide a ball-bearing for the spring-support, whereby the compression of the spring will not increase the friction to be overcome in turning the valve.

With these objects in view the invention consists of the several details of construction and combination of parts, as will be hereinafter fully described, and particularly pointed out in the claims.

Figure 1:
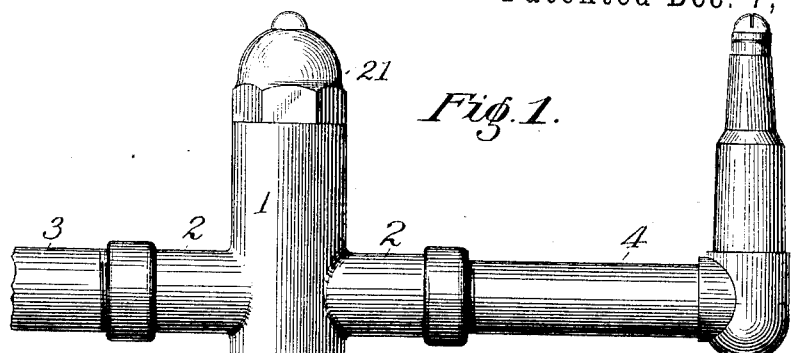
Figure 2:
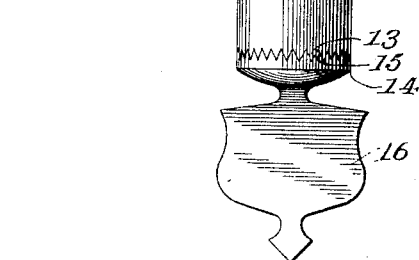
Figure 2:
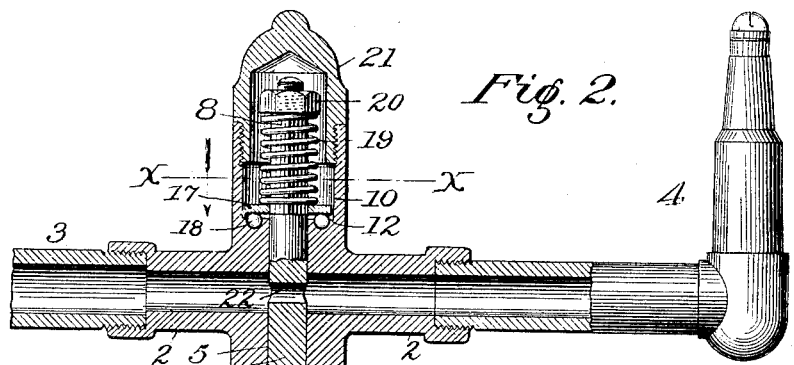
Figure 3:
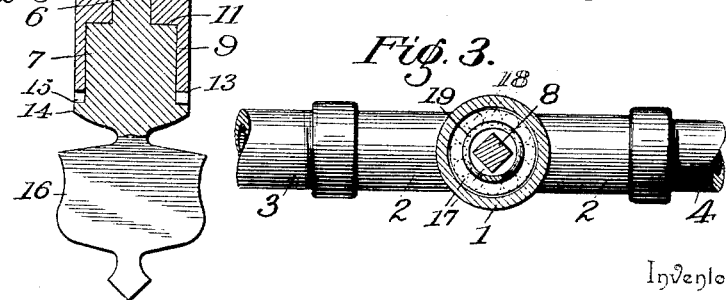

In the drawings, Figure 1 is a side elevation of a gas-cock constructed in accordance with my invention. Fig. 2 is a vertical section of the same. Fig. 3 is a horizontal section on the line $x\ x$ of Fig. 1.

Similar reference-numerals indicate similar parts in the several figures.

1 indicates the body of the cock, having preferably laterally-extending arms 2, adapted, respectively, to be connected to the gas-supply pipe 3 and the burner 4, although it is obvious the latter may be integral with the body of the cock. The body of the cock is bored out, as indicated at 5, to form a seat for the valve, and this bore intersects the passage for the gas, as will be readily understood.

The valve is in the form of a straight cylindrical plug 6, having a head or enlargement 7 at one end and an angular portion 8 at its other end. The bore 5 is enlarged at each end, as indicated at 9 and 10, and internal annular shoulders 11 and 12 are thus formed within the body of the valve. The enlarged portion 9 of the bore receives the head 7 of the valve, and this end of the body of the valve is cut to form a series of teeth 13. The outer end of the head 7 is provided with an annular flange 14, which is also provided with a series of teeth 15, adapted to interlock with the teeth 13 of the valve-body and prevent axial turning of the valve.

16 indicates a finger-piece which may either be integral with the head 7 or be secured thereto in any suitable manner, as preferred.

17 indicates a washer adapted to fit loosely within the enlarged portion 10 of the bore in the valve-body, and this washer is provided with a central angular opening through which the angular end portion 8 of the valve passes, and the washer will thus be caused to turn when the valve is turned.

18 indicates balls interposed between the washer 17 and the shoulder 12, and 19 is a coiled spring fitted over the angular end portion of the valve, and this spring is supported at one end by the washer 17 and at its other end by a nut 20, which screws on the threaded end of the valve. The enlarged portion 10 of the bore in the body of the valve will be of sufficient size to permit the spring 19, washer 17, and nut 10 to turn freely therein. Preferably a cap 21 will be fitted on the valve-body to close the bore and prevent entrance of dirt, &c., to the valve-seat. The valve will of course be provided with the usual transverse passage 22 to establish communication between the gas-supply pipe and the burner.

From the foregoing description it will be seen that the normal tendency of the spring 19 is to lock the teeth 13 and 15 in engagement with each other, and when so locked the valve cannot be accidentally turned. When it is desired to turn the valve, the finger-piece 16 will be grasped and the valve pulled out a slight distance from the valve-body against the force of the spring 19 until the teeth 13 and 15 are disengaged, when the valve may be turned in the usual manner, and as soon as the finger-piece is released the spring will automatically move the valve longitudinally to its normal position and cause the teeth 13 and 15 to again interlock. When the spring 19 is compressed by moving the valve outward longitudinally, the pressure caused by such compression will be exerted on the washer 17, but as the anti-friction-balls 18 are interposed between the washer and the shoulder 12 the pressure exerted by the spring on the washer will have no effect in increasing the friction to be overcome in turning the valve, since the washer will move with perfect freedom over the antifriction-balls, as will be readily understood.

It will be understood that changes in the form, proportion, and the minor details of construction may be resorted to without departing from the spirit or sacrificing any of the advantages of this invention.

Having thus described the invention, what I claim is—

1. In a safety gas-cock, the combination with the body of the cock provided with a bore enlarged at each end, and a series of teeth at one end, of a valve seated in said bore and having a head at one end to fit in one of the enlarged portions of the bore, and a series of teeth to interlock with the teeth on the body of the cock, a washer loosely fitted over the other end of the valve to turn therewith within the other enlarged portion of the bore, antifriction-balls between the washer and a seat within the body, a coiled spring fitted over the valve and resting upon the washer, and a device secured to the valve to engage the other end of the spring, substantially as and for the purpose specified.

2. In a safety gas-cock, the combination with the body of the cock provided with a bore, enlarged at each end, and a series of teeth at one end, of a valve seated in said bore and having a head at one end to fit in one of the enlarged portions of the bore, said head having an annular flange at its outer end provided with teeth to interlock with the teeth on the body of the cock, and the other end portion of the valve being angular and extending into the other enlarged portion of the bore, a washer fitting loosely over the angular portion of the valve to turn therewith, antifriction-balls between the washer and a seat within the body, a coiled spring fitted over the valve and resting on the washer, and a nut on the valve to engage the other end of the spring, substantially as described.

In testimony that I claim the foregoing as my own I have hereto affixed my signature in the presence of two witnesses.

RUDOLPH BUSSE.

Witnesses:
 HENRY A. KRAUSE,
 URIAH YOUNG.